(12) United States Patent
Stupar et al.

(10) Patent No.: US 10,212,747 B2
(45) Date of Patent: Feb. 19, 2019

(54) SYSTEMS AND METHODS FOR PRIORITY BASED SESSION AND MOBILITY MANAGEMENT

(71) Applicant: Qualcomm Incorporated, San Diego, CA (US)

(72) Inventors: Patrick Stupar, Nuremberg (DE); Miguel Griot, San Diego, CA (US); Ramachandran Subramanian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/734,822

(22) Filed: Jan. 4, 2013

(65) Prior Publication Data

US 2013/0195038 A1 Aug. 1, 2013

Related U.S. Application Data

(60) Provisional application No. 61/591,752, filed on Jan. 27, 2012.

(51) Int. Cl.
H04W 76/15 (2018.01)

(52) U.S. Cl.
CPC .................. H04W 76/15 (2018.02)

(58) Field of Classification Search
CPC ....... H04W 76/02; H04W 36/14; H04W 4/00; H04W 76/00; H04W 36/06; H04W 8/08; H04W 36/24; H04W 24/08; H04W 36/16; H04W 60/00; H04W 24/04; H04W 8/02; H04W 76/15; H04W 76/025; H04M 11/04; H04M 3/42; H04M 3/00

USPC ....... 370/230, 328, 252, 352, 242, 332, 336; 709/217, 224; 455/452.1, 452.2, 404.2, 455/552.1, 422.1, 11.1
See application file for complete search history.

(56) References Cited

U.S. PATENT DOCUMENTS

| 2004/0002334 A1 | 1/2004 | Lee et al. |
| 2007/0207824 A1 | 9/2007 | Bhattacharjee et al. |

(Continued)

FOREIGN PATENT DOCUMENTS

| CN | 101969635 A | 2/2011 |
| CN | 102118859 A | 7/2011 |

(Continued)

OTHER PUBLICATIONS

International Search Report and Written Opinion—PCT/US2013/077548—ISA/EPO—dated Apr. 24, 2014.

(Continued)

*Primary Examiner* — Walli Z Butt
(74) *Attorney, Agent, or Firm* — Holland & Hart LLP/Qualcomm

(57) ABSTRACT

Systems, methods, and devices for priority based management of the connections between a device and a network are described herein. In some aspects, a device may include multiple applications with different access priorities. As a result of a mobility event, such as change in location or resuming operation after an idle period, the device may be configured to transmit a signal indicating its status. The signal may include an access priority value. Various methods and systems for determining an access priority value for devices configured to support one or more access priorities are described.

30 Claims, 6 Drawing Sheets

(56) References Cited

U.S. PATENT DOCUMENTS

| | | | |
|---|---|---|---|
| 2010/0279648 | A1 | 11/2010 | Song et al. |
| 2011/0199905 | A1* | 8/2011 | Pinheiro et al. .............. 370/235 |
| 2011/0219126 | A1* | 9/2011 | Aramoto ............. H04L 29/1232 709/228 |
| 2012/0014352 | A1* | 1/2012 | Giaretta ........................ 370/331 |
| 2012/0014381 | A1 | 1/2012 | Dwyer et al. |
| 2012/0087255 | A1* | 4/2012 | Ukita et al. .................... 370/252 |
| 2012/0124229 | A1 | 5/2012 | Sahu et al. |
| 2012/0218889 | A1 | 8/2012 | Watfa et al. |
| 2012/0230178 | A1 | 9/2012 | Wang et al. |
| 2012/0263036 | A1* | 10/2012 | Barclay ............. H04W 28/0247 370/230 |
| 2013/0044596 | A1 | 2/2013 | Zhi et al. |
| 2013/0044603 | A1* | 2/2013 | Macias ................. H04W 48/18 370/241 |
| 2013/0150024 | A1* | 6/2013 | Burbidge et al. ............. 455/423 |
| 2013/0322274 | A1* | 12/2013 | Zakrzewski ........ H04W 28/021 370/252 |
| 2014/0161055 | A1* | 6/2014 | Chitrapu ............... H04W 76/12 370/329 |

FOREIGN PATENT DOCUMENTS

| | | |
|---|---|---|
| JP | 2011101169 A | 5/2011 |
| JP | 2015505446 A | 2/2015 |
| JP | 2015510323 A | 4/2015 |
| WO | 2008066582 A1 | 6/2008 |
| WO | WO-2011147358 A1 | 12/2011 |
| WO | WO-2012147291 A1 | 11/2012 |
| WO | WO-2013109061 A1 | 7/2013 |
| WO | WO-2013109087 A1 | 7/2013 |

OTHER PUBLICATIONS

Nokia Siemens Networks et al: "Discussion on Multi-level priorities", 3GPP Draft; C1-120191_Multilevelpriorities, 3rd Generation Partnership Project (3GPP), Mobile Competence Centre ; 650, Route Des Lucioles ; F-06921 Sophia-Antipolis Cedex ; France, vol. CT WG1, No. Xiamen (P.R. China); Feb. 6, 2012-Feb. 10, 2012, Jan. 30, 2012 (Jan. 30, 2012), XP050556500, [retrieved on Jan. 30, 2012].

Qualcomm Incorporated: "Identified issues for devices with dual priority applications", 3GPP Draft; C1-120418-MTC-Multiple-Appl, 3rd Generation Partnership Project (3GPP), Mobile Competence Centre ; 650, Route Des Lucioles ; F-06921 Sophia-Antipolis Cedex ; France, vol. CT WG1, No. Xiamen, China; Feb. 6, 2012-Feb. 10, 2012, Jan. 30, 2012 (Jan. 30, 2012), XP050556667, [retrieved on Jan. 30, 2012].

Secretary of SA WG2: "Report of SA WG2 meetings #83", 3GPP Draft; Approved_Report_V100_SA2_83, 3rd Generation Partnership Project (3GPP), Mobile Competence Centre ; 650, Route Des Lucioles ; F-06921 Sophia-Antipolis Cedex ; France, vol. SA WG2, No. Salt Lake City, Utah, USA; Feb. 21, 2011-Feb. 25, 2011, Dec. 7, 2011 (Dec. 7, 2011), XP050575169, [retrieved on Dec. 7, 2011].

Vodafone et al., : "M2M devices with dual priority applications", 3GPP Draft; CP-110912, 3rd Generation Partnership Project (3GPP), Mobile Competence Centre ; 650, Route Des Lucioles ; F-06921 Sophia-Antipolis Cedex ; France, vol. TSG CT, No. Berlin, Germany; Dec. 7, 2011-Dec. 9, 2011, Jan. 3, 2012 (Jan. 3, 2012), XP050575884, [retrieved on Jan. 3, 2012].

LG Electronics, "Clarification of procedures for rejecting a UE configured for low priority and/or MTC", 3GPP TSG-SA WG2#81, S2-104918, Oct. 2010, 16 pages. URL: http://www.3gpp.org/ftp/tsg_sa/WG2_Arch/TSGS2_81_Prague/Docs/S2-104918.zip.

Yang F.Y., "LS on Low Access Priority Indication", 3GPP TSG SA WG2 Meeting #S2-83, Feb. 21-25, 2011, Salt Lake City, Utah, USA, S2-110301, Feb. 7, 2011, 2 Pages.

3GPP: "3rd Generation Partnership Project; Technical Specification Group Services and System Aspects; System Improvements for Machine-Type Communications; (Release 11)", 3GPP Draft; 23888-130-CL, 3rd Generation Partnership Project (3GPP), Mobile Competence Centre; 650, Route Des Lucioles; F-06921, Sophia-Antipolis Cedex: France, vol. SA WG2, No. Naantali; Jul. 11, 2011, Jul. 5, 2011, XP050548317, 130 pages.

3rd Generation Partnership Project; Technical Specification Group Core Network and Terminals; Non-Access-Stratum (NAS) Protocol for Evolved Packet System (EPS); Stage 3 (Release 10), 3GPP Standard; 3GPP TS 24.301, 3rd Generation Partnership Project (3GPP), Mobile Competence Centre; 650, Route Des Lucioles; F-06921 Sophia-Antipolis Cedex; France, vol. CT WG1, No. V10. 5.0, Dec. 20, 2011, pp. 1-322, XP050554710.

TSG CT: "LS on M2M Devices with Dual Priority Applications," 3GPP Draft; S2-120020_CP-110938, 3rd Generation Partnership Project (3GPP), Mobile Competence Centre; 650, Route Des Lucioles; F-06921 Sophia-Antipolis Cedex; France, vol. SA WG2, No. Elbonia; Jan. 12, 2012-Jan. 18, 2012, Jan. 3, 2012, XP050575898, 2 pages.

* cited by examiner

SYSTEMS AND METHODS FOR PRIORITY BASED SESSION AND MOBILITY MANAGEMENT

CROSS-REFERENCE TO RELATED APPLICATIONS

This application claims a priority benefit under 35 U.S.C. § 119(e) from U.S. Provisional Application No. 61/591,752 filed Jan. 27, 2012 the contents of which are hereby incorporated by reference in their entirety.

BACKGROUND

Field

The present application relates generally to network communications, and more specifically to systems, methods, and devices for priority based management of the connections between a device and a network.

Background

Networked communication systems are widely deployed to provide various types of communication content such as voice and data. Typical network communication systems may be multiple-access systems capable of supporting communication with multiple users by sharing available system resources (e.g., bandwidth, transmit power). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP2, 3GPP long-term evolution (LTE), LTE Advanced, etc.

Generally, multiple-access communication systems may simultaneously support communication for multiple devices. Each device may communicate with one or more base stations via transmissions on forward and reverse links. The forward link (or downlink) refers to the communication link from base stations to devices, and the reverse link (or uplink) refers to the communication link from devices to base stations.

As the demand for high-rate and multimedia data services rapidly grows, there has been an effort toward implementation of efficient and robust communication systems with enhanced performance. For example, in recent years, users have started to replace fixed line communications with mobile communications and have increasingly demanded high voice quality, reliable service, and low prices.

To accommodate increasing demand, evolution of core networks of network communication systems included aspects from the evolution of radio interfaces. For example, System Architecture Evolution (SAE) lead by 3GPP aims to evolve a Global System for Mobile communications (GSM)/General Packet Radio Service (GPRS) core network. The resultant Evolved Packet Core (EPC) is a multi-access core network based on the Internet Protocol (IP) that enables operators to deploy and utilize one common packet-based core network with a plurality of radio access technologies. The EPC provides optimized mobility for mobile devices and enables efficient handovers between different radio access technologies (e.g., between LTE and High Rate Packet Data (HRPD)). In addition, standardized roaming interfaces enable operators to offer services to subscribers across a variety of access technologies.

As the number and types of devices capable of accessing operator networks increases, certain characteristics of the device may be used to determine how the device interacts with the network. For example, in some implementations, devices may include a priority. Consider a machine-to-machine detector which is scheduled to transmit data once a day. This device may be categorized as a low priority device. A normal priority device may include a mobile telephone or a smart phone. Furthermore, as the devices increase in sophistication, devices may be configurable to execute applications. The applications may further be prioritized, such as low priority applications and normal applications.

Given the variety of configurations and priorities that may exist for a given device, improved systems, methods, and devices for managing the connections between the device and the network are desirable.

SUMMARY

Various implementations of systems, methods and devices within the scope of the appended claims each have several aspects, no single one of which is solely responsible for the desirable attributes described herein. Without limiting the scope of the appended claims, some prominent features are described herein. Other features, aspects, and advantages will become apparent from the description, the drawings, and the claims.

In one aspect, an apparatus for communicating in a network is provided. The apparatus includes a processor. The processor is configured to establish a first packet switched connection having a first priority for a first application. The processor is further configured to establish a second packet switched connection having a second priority for a second application. The processor is also configured to transmit a control plane message including priority information based at least in part on the first priority and the second priority.

In another aspect, a method of communicating in a network is provided. The method includes establishing a first packet switched connection having a first priority for a first application. The method also includes packet switched establishing a second connection having a second priority for a second application. The method further includes transmitting a control plane message including priority information based at least in part on the first priority and the second priority.

In a further innovative aspect, a non-transitory computer readable medium including instructions is provided. The instructions when executed by an apparatus cause the apparatus to establish a first packet switched connection having a first priority for a first application. The instructions further cause the apparatus to establish a second packet switched connection giving a second priority for a second application. The instructions also cause the apparatus to transmit a control plane message including priority information based at least in part on the first priority and the second priority.

In one aspect, another apparatus for communicating in a network is provided. The apparatus includes means for establishing a first packet switched connection having a first priority for a first application. The apparatus further includes means for establishing a second packet switched connection having a second priority for a second application. The apparatus also includes means for transmitting a control plane message including priority information based at least in part on the first priority and the second priority.

Figure 1:
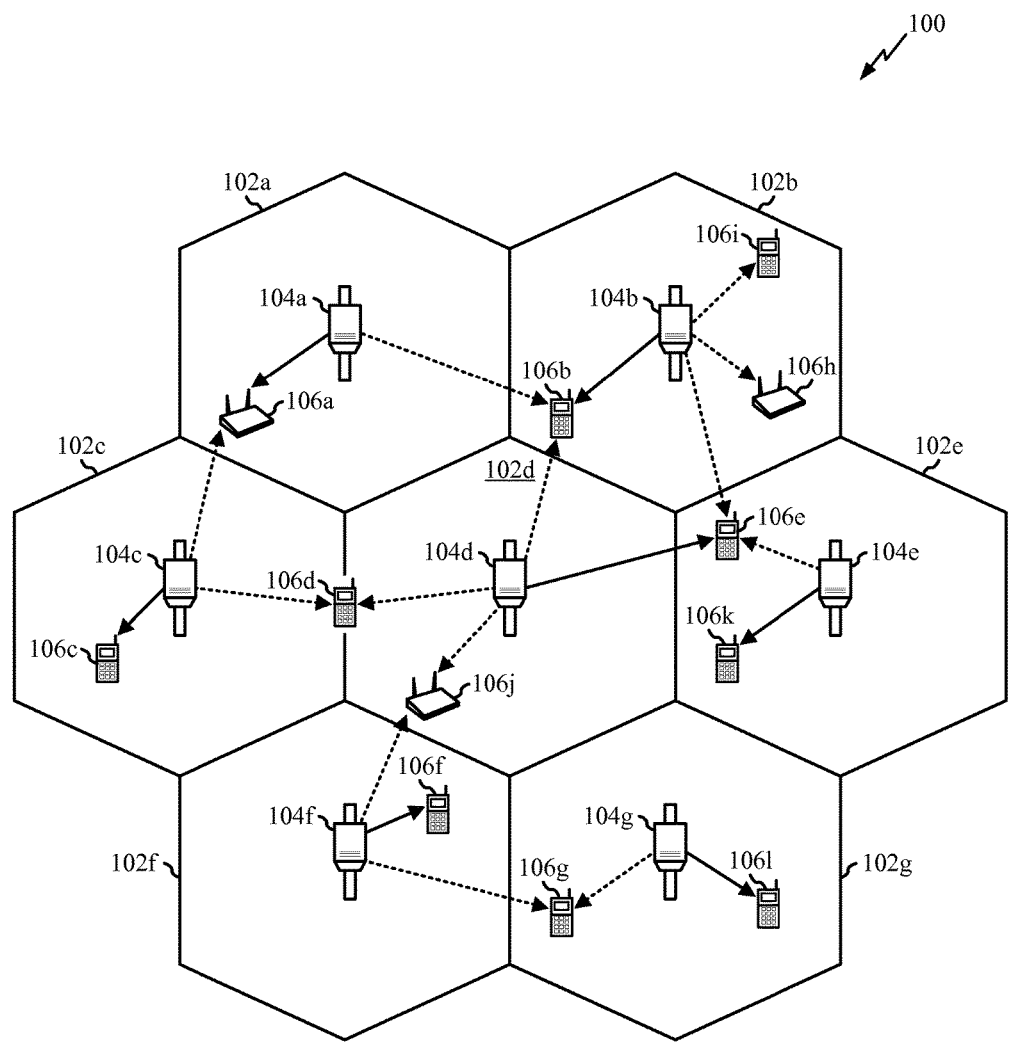
FIG. 1 illustrates an example of a communication network in which aspects of the present disclosure may be employed.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different network technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The word "exemplary" is used herein to mean "serving as an example, instance, or illustration." Any implementation described herein as "exemplary' is not necessarily to be construed as preferred or advantageous over other implementations. The following description is presented to enable any person skilled in the art to make and use the invention. Details are set forth in the following description for purpose of explanation. It should be appreciated that one of ordinary skill in the art would realize that the invention may be practiced without the use of these specific details. In other instances, well known structures and processes are not elaborated in order not to obscure the description of the invention with unnecessary details. Thus, the present invention is not intended to be limited by the implementations shown, but is to be accorded with the widest scope consistent with the principles and features disclosed herein.

The techniques described herein may be used for various wired and/or wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM, etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art.

Furthermore, in the following description, for reasons of conciseness and clarity, terminology associated with the UMTS systems is used. It should be emphasized that the disclosed techniques may also be applicable to other technologies, such as technologies and the associated standards related to LTE Advanced, LTE, W-CDMA, TDMA, OFDMA, High Rate Packet Data (HRPD), Evolved High Rate Packet Data (eHRPD), Worldwide Interoperability for Microwave Access (WiMax), GSM, enhanced data rate for GSM evolution (EDGE), and so forth. Terminologies associated with different technologies can vary. For example, depending on the technology considered, the User Equipment (UE) used in UMTS can sometimes be called a mobile station, a user terminal, a subscriber unit, an access terminal, etc., to name just a few. Likewise, Node B used in UMTS can sometimes be called an evolved Node B (eNodeB), an access node, an access point, a base station (BS), HRPD base station (BTS), and so forth. It should be noted here that different terminologies apply to different technologies when applicable.

FIG. 1 illustrates an example of a communication network or system 100 in which aspects of the present disclosure may be employed. The communication network 100 may include aspects which operate pursuant to a wireless standard, for example the LTE Advanced standard, LTE standard, WiMax standard, GSM standard, EDGE standard, 802.11ah standard, WiFi Advanced-N standard, and so forth. The communication system 100 may include an access point (AP) 104, which communicates with stations (STAs) 106.

An access point (AP) may comprise, be implemented as, or known as a Node B, Radio Network Controller (RNC), eNodeB, Base Station Controller (BSC), Base Transceiver Station (BTS), Base Station (BS), Transceiver Function (TF), Radio Router, Radio Transceiver, or some other terminology.

A station STA may comprise, be implemented as, or known as an access terminal (AT), a subscriber station, a subscriber unit, a mobile station, a remote station, a remote terminal, a user terminal, a user agent, a user device, user equipment (UE), or some other terminology. In some implementations an access terminal may comprise a cellular telephone, a cordless telephone, a Session Initiation Protocol (SIP) phone, a wireless local loop (WLL) station, a personal digital assistant (PDA), a handheld device having wired and/or wireless connection capability, or some other suitable processing device connected to a network modem. Accordingly, one or more aspects disclosed herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a wireless sensor device, a global positioning system device, or any other suitable device that is configured for network communication.

A variety of processes and methods may be used for transmissions in the communication system 100 between the AP 104 and the STAs 106. For example, signals may be sent and received between the AP 104 and the STAs 106 in accordance with OFDM/OFDMA techniques. If this is the case, the communication system 100 may be referred to as an OFDM/OFDMA system. Alternatively, signals may be sent and received between the AP 104 and the STAs 106 in accordance with W-CDMA or CDMA techniques. If this is the case, the communication system 100 may be referred to as a W-CDMA or CDMA system.

A communication link that facilitates transmission from the AP 104 to one or more of the STAs 106 may be referred to as a downlink (DL), and a communication link that facilitates transmission from one or more of the STAs 106 to the AP 104 may be referred to as an uplink (UL). Alternatively, a downlink may be referred to as a forward link or a forward channel, and an uplink may be referred to as a reverse link or a reverse channel.

The AP 104 may be configured as a base station and provide communication coverage in a basic service area (BSA) 102. Depending on the technology considered, BSA can sometimes be called coverage area, cell, etc. The AP 104 along with the STAs 106 associated with the AP 104 and that use the AP 104 for communication may be referred to as a basic service set (BSS). It should be noted that the communication system 100 may not have a central AP 104, but rather may function as a peer-to-peer network between the STAs 106. Accordingly, the functions of the AP 104 described herein may alternatively be performed by one or more of the STAs 106.

Figure 2:
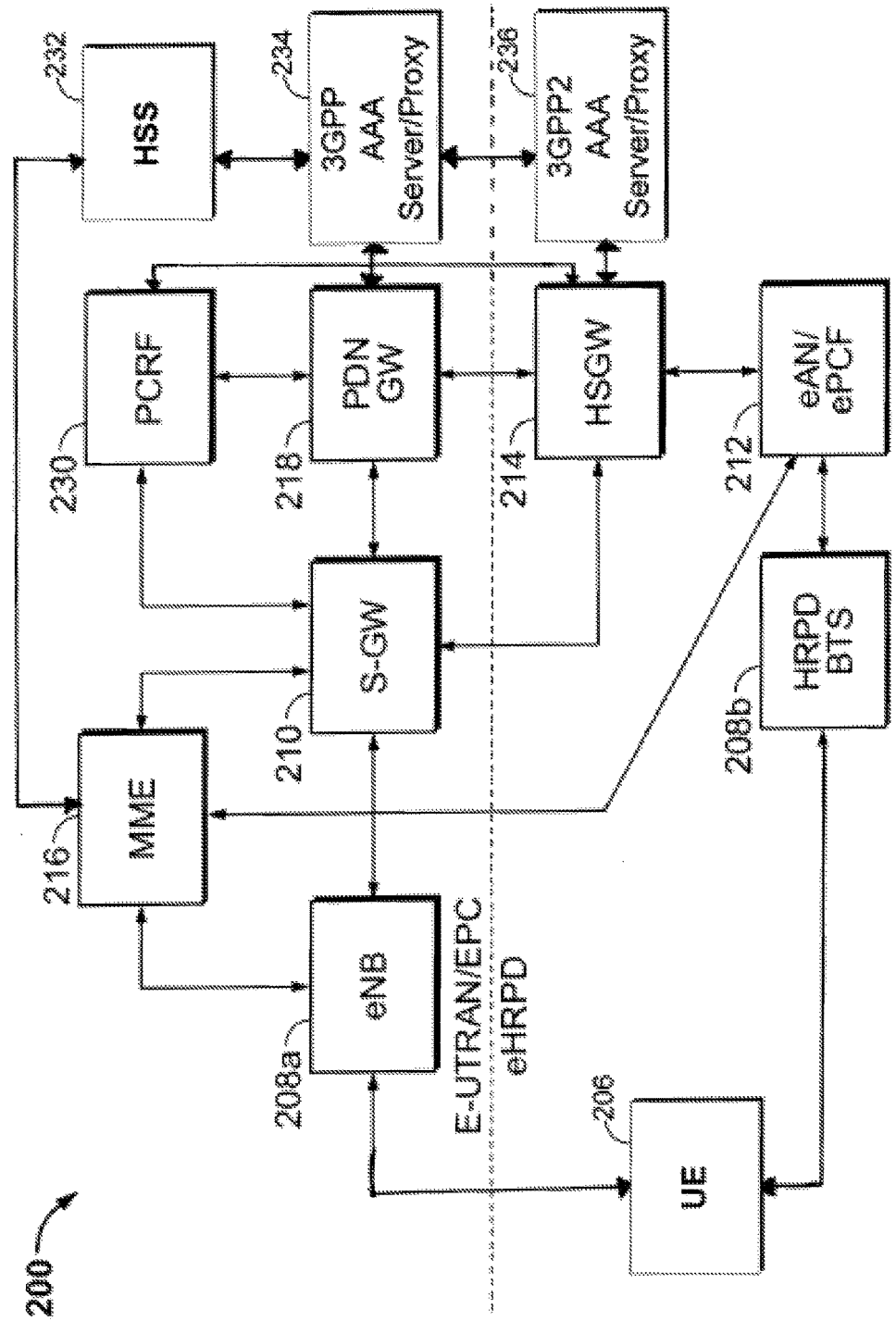
FIG. 2 illustrates an example of a functional block diagram of certain communication entities of the communication network of FIG. 1.

FIG. 2 illustrates an example of a functional block diagram of a system 200 of certain communication entities of the communication network of FIG. 1. The components shown in FIG. 2 illustrate a system in which a multimode or multiband device may communicate using multiple radio access technologies (RATs), for example an eHRPD network, an LTE network, etc. depending on the configuration of the network in the location in which the mobile device is currently operating. As FIG. 2 illustrates, the system 200 may include a radio access network RAN that provides wireless radio communications between a UE 206 and an eNodeB 208a (e.g., a Node B, base station, access point, etc.) using LTE radio access technology. The system also depicts a RAN which provides wireless radio communications between a UE 206 and a HRPD base transceiver station (BTS) 208b (e.g., a Node B, base station, access point etc.) using eHRPD radio access technology. For simplicity of discussion, FIG. 2 depicts a UE 206 and one eNodeB 208a in a RAN and one HRPD BTS 208b in another RAN; however, it is to be appreciated that each RAN may include any number of UEs and/or eNodeBs/HRPD BTSs. In addition, it is to be appreciated that additional RANs may be included, such as UTRA, GSM, EDGE, and so forth.

In accordance with one aspect, the eNodeB 208a and HRPD BTS 208b may transmit information to a UE 206 over a forward link or downlink channel and a UE 206 can transmit information to the eNodeB 208a and HRPD BTS 209b over a reverse link or uplink channel. As shown, RANs can utilize any suitable type of radio access technology such as, but not limited to, LTE, LTE Advanced, HSPA, CDMA, HRPD, eHRPD, CDMA2000, GSM, GPRS, EDGE, UMTS, or the like.

The RANs, and specifically the eNodeB 208a and HRPD BTS 208b, can communicate with a core network that enables charging (e.g., usage charges for services, etc.), security (e.g., ciphering and integrity protection), subscriber management, mobility management, bearer management, QoS handling, policy control of data flows, and/or interconnections with external networks. The RANs and core network can communicate via an S1 interface, for instance. The core network can include a mobility management entity (MME) 216 that can be an end-point for control signaling from the RAN. The MME 216 can provide functions such as mobility management (e.g., tracking), authentication, and security. The MME 216 can communicate with the RANs via the S1 interface. The core network can also include a serving gateway (S-GW) 210 which is a user plane node that connects the core network to the LTE RAN. The core network may also include a HRPD serving gateway (HSGW) 214 which connects the core network to the eHRPD RAN. The eHRDP RAN also includes an evolved access node (eAN) and an evolved packet control function (ePCF) entity 212 which manages the relay of packets between the HRPD BTS 208b and the HSGW 214.

In an aspect, the MME 216 can communicate with the S-GW 210 or the eAN/ePCF 212 via an S11 interface. Furthermore, the HSGW 214 and the S-GW 210 may communicate to facilitate interoperability between the eHRPD network and the EPC. In another aspect, the MME 216 and S-GW 210 can be configured as a single node to provide a single end-point for user and control signaling originating from a RAN and/or terminating at a RAN. The network may also include a policy and charging rules function (PCRF) 230. The PCRF 230 may communicate with the S-GW 210, the HSGW 214, a PDN GW 218 and the core network.

The core network can also include a packet data network (PDN) gateway (GW) 218 that facilitates communications between the core network (and the RANs) and external networks. The PDN GW 218 can provide packet filtering, QoS policing, charging, IP address allocation, and routing of traffic to external networks. In an example, the S-GW 210 and the PDN GW 218 can communicate via an S5 interface.

While illustrated as separate nodes in FIG. 2, it is to be appreciated that the S-GW 210 and PDN GW 218, for example, can be configured to operate as a single network node to reduce user plane nodes in core network. In one aspect, the core network may also include a 3GPP authentication, authorization and accounting (AAA) server/proxy 234 and a 3GPP2 AAA server/proxy 236 which many communicate with each other and further communicate with the PDN GW 218 and the HSGW 214 respectfully. The core network may also include a home subscriber services (HSS) entity 232 which may communicate with the MME 216 and the 3GPP AAA server/proxy 234. In some implementations, the path between the PDN GW 218 and the UE 206 may be referred to as a packet data network connection. A packet data network connection may be identified by one or more network (e.g., IP) addresses The core network can communicate with external networks via the PDN GW 218. The external networks, not shown, can include networks such as, but not limited to, a public switched telephone network (PSTN), an IP multimedia subsystem (IMS), and/or an IP network. The IP network can be the Internet, a local area network, a wide area network, an intranet, or the like. It should be appreciated that configuration shown in FIG. 2 is an example of just one possible configuration and many other configurations and additional components may be used in accordance with various aspects and implementations described below.

The communication network shown in FIG. 2 illustrates certain wireless technologies. In some implementations, the UE 206 may be configured to access the communication network via a wired connection. For example, the UE 206 may connect via a local area network to a device coupled with the communication network. The device may be a router or a modem (e.g., cable modem, digital subscriber line model, satellite modem) configured to transmit and receive communications.

Figure 3:
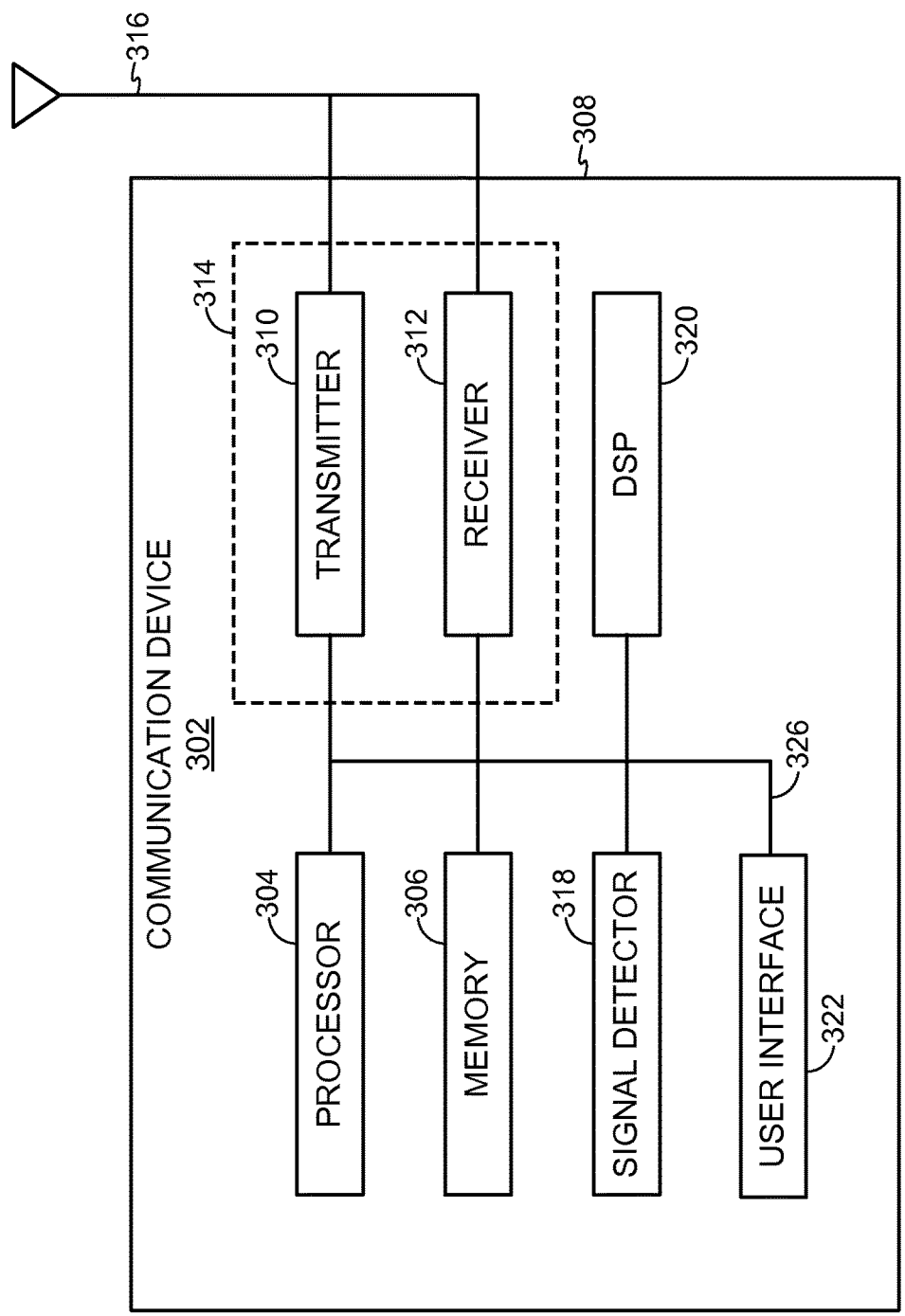
FIG. 3 illustrates an example of a functional block diagram of a communication device that may be employed within the communication network of FIG. 1.

FIG. 3 illustrates an example of a functional block diagram of a communication device that may be employed within the communication network of FIG. 1. The communication device 302 is an example of a device that may be configured to implement the various methods described herein. For example, the communication device 302 can comprise a STA, a UE, an AT, a subscriber station, a subscriber unit, a mobile station, a remote station, a remote terminal, a user terminal, a user agent, a user device, etc. As another example, the communication device 302 may be multimode or multiband device, capable of operating using different radio access technologies (RATs), such as using LTE, LTE Advanced, HSPA, CDMA, HRPD, eHRPD, CDMA2000, GSM, GPRS, EDGE, UMTS, or the like.

The communication device 302 may include a processor 304 which controls operation of the communication device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The data in memory 306 may include configuration data. Configuration data may be preloaded into the memory 306. Configuration data may be obtained from a user of the communication device 302 (e.g., through an interface 322, SIM card, download, over the air). The processor 304 may perform logical and arithmetic operations further based on the configuration data.

In some aspects, the processor 304 is configured to cause signals to be sent and receive signals from another device (e.g., AP 104, STA 106, etc.). The signals may include mobility or session management signals to allow applications running on the communication device 302 to access network services. In some aspects, the processor 304 is further configured to control how and when the management signals will be transmitted. For example, in some implementations, the communication device 302 may move from one location to another. As a result of the movement, the AP 104 previously providing network services to the communication device 302 may no longer be within range. Accordingly, the communication device 302 may need to transfer to a new AP 104. This is generally referred to as mobility management.

In some implementations, the processor 304 may be configured to cause the transmission of a signal indicating the location change. For example, a tracking area update (TAU) signal may be transmitted by the communication device 302. Included in the TAU signal may be an indicator of an access priority for the communication device 302. In some implementations, the communication device 302 may be configured to transmit a location update signal and/or a routing area update signal as part of mobility management. The location update signal or the routing area update signal may also include an access priority indicator. How the indicator to be included in the signal is determined will be described in further detail below.

The processor 304 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The communication device 302 may also include a housing 308 that includes the transmitter 310 and/or the receiver 312 to allow transmission and reception of data between the communication device 302 and a remote location. As alluded to above, the transmitter 310 may be configured to wirelessly transmit status information. Further, the receiver 312 may be configured to wirelessly receive user data. The transmitter 310 and receiver 312 may be combined into a transceiver 314. An antenna 316 may be attached to the housing 308 and electrically coupled to the transceiver 314. The communication device 302 may also include (not shown) multiple transmitters, multiple receivers, multiple transceivers, and/or multiple antennas. In some configurations, the transmitter 310 and/or the receiver 312 may be implemented for wired communication in addition to or as an alternative to wireless communication.

The communication device 302 may also include a signal detector 318 that may be used in an effort to detect and quantify the level of signals received by the transceiver 314. The signal detector 318 may detect such signals as total energy, energy per subcarrier per symbol, power spectral density, and other signals. The communication device 302 may also include a digital signal processor (DSP) 320 for use in processing signals. The DSP 320 may be configured to generate a packet for transmission and/or process a received packet.

In some aspects, the communication device 302 may further comprise a user interface 322. The user interface 322 may comprise a keypad, a microphone, a speaker, and/or a display. The user interface 322 may include any element or component that conveys information to a user of the communication device 302 and/or receives input from the user.

The various components of the communication device 302 may be coupled together by a bus system 326. The bus system 326 may include a data bus, for example, as well as a power bus, a control signal bus, and a status signal bus in addition to the data bus. Those of skill in the art will appreciate the components of the communication device 302 may be coupled together or accept or provide inputs to each other using some other mechanism.

Although a number of separate components are illustrated in FIG. 3, those of skill in the art will recognize that one or more of the components may be combined or commonly implemented. For example, the processor 304 may be used to implement not only the functionality described above with respect to the processor 304, but also to implement the functionality described above with respect to the signal detector 318 and/or the DSP 320. Further, each of the components illustrated in FIG. 3 may be implemented using a plurality of separate elements. For example, the processor 304 and the memory 306 may be embodied on a single chip. The processor 304 may additionally, or in the alternative, contain memory, such as processor registers. Similarly, one or more of the functional blocks or portions of the functionality of various blocks may be embodied on a single chip. Alternatively, the functionality of a particular block may be implemented on two or more chips.

In this specification and the appended claims, it should be clear that the term "circuitry" is construed as a structural term and not as a functional term. For example, circuitry can be an aggregate of circuit components, such as a multiplicity of integrated circuit components, in the form of processing and/or memory cells, units, blocks, and the like, such as shown and described in FIG. 3. One or more of the functional blocks and/or one or more combinations of the functional blocks described with respect to the communication device 302 may also be implemented as a combination of computing devices, e.g., a combination of a DSP and a microprocessor, a plurality of microprocessors, one or more microprocessor in conjunction with a DSP communication, or any other such configuration.

Figure 4:
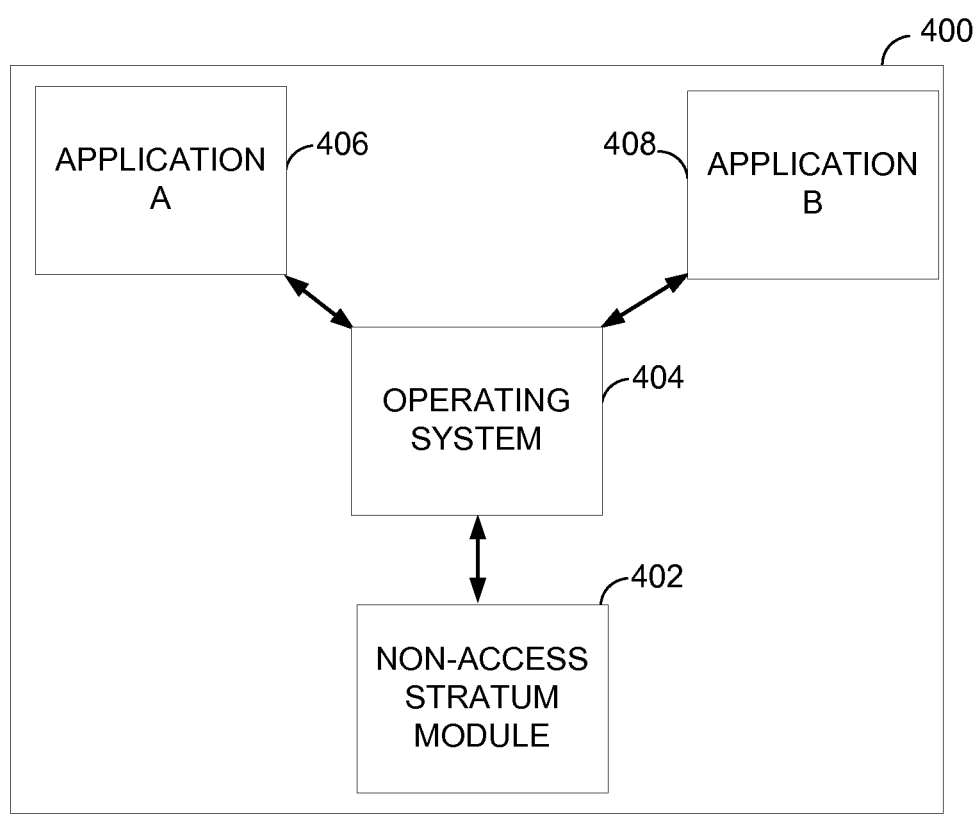
FIG. 4 illustrates a functional block diagram of an exemplary user equipment that may be employed within the communication network of FIG. 1.

FIG. 4 illustrates a functional block diagram of an exemplary user equipment that may be employed within the communication network of FIG. 1. The UE 400 shown in FIG. 4 includes a non-access stratum module 402. The non-access stratum module 402 may be configured to perform non-access stratum (NAS) signaling for the UE 400. NAS signaling is a type of control plane signaling that can be used to establish and maintain a connection between the UE 400 and a network. Two aspects of maintaining network connections are the mobility and the session. Accordingly, when a UE moves or transitions from an idle state, the mobility information may need to be updated. Similarly, the session, such as a data or voice communication session, may need to be updated such as where an UE changes radio access technologies.

In the implementation shown, the non-access stratum module 402 is coupled with the operating system 404. The operating system 404 is a general application that may be executed by a processor of the UE 400. The operating system 404 provides basic access to applications to low level functions of the UE 400 such as network connections. The operating system 404 may be a set of instructions stored in a memory associated with the UE 400 which are executable by the processor of the UE 400.

As shown in FIG. 4, two applications, application A 406 and application B 408, are included in the UE 400. The application A 406 and the application B 408 may be a set of instructions stored in a memory associated with the UE which are executable by the processor of the UE 400. The application A 406 and the application B 408 may be configured to request and utilize network services through the operating system 404. The network services may include network connections such as packet switched connections. Each application may request and receive a dedicated instance of the network service. For example, in the UE 400 of FIG. 4, application A 406 may acquire a first packet switched network connection and application B 408 may acquire a second packet switched network connection. The UE 400 may include additional applications which may each acquire network services in a similar fashion. How the UE 400 manages these multiple network services (e.g., packet switched connections, IP addresses, etc.) can impact the overall performance of the UE 400.

In some implementations, the operating system 404 provides an interface to applications to the network services. By invoking various procedures through the interface, low level functions, such as NAS signaling to establish and/or maintain a network connection, may be accessed without each application being concerned with the details of NAS signaling. Instead, the NAS signaling is handled by the non-access stratum module 402. While the implementation shown in FIG. 4 includes two applications, the methods and systems described are also applicable for an UE that may include one or more applications.

The UE 400 may be assigned a priority. For example, when the UE 400 attaches to a network, the network may identify the device class of the UE 400 based on a signal received from the UE 400. For instance, the UE 400 may be identified as a machine-to-machine device. Accordingly, the network operator may assign a priority based on characteristics of the device. In some implementations, the priority may be one of normal or low priority. It will be appreciated that additional levels of priority may be included without departing from the scope of the disclosure.

Furthermore, as applications create network connections, the application may be associated with a priority. In some implementations network operator may assign a priority to a connection. In some implementations, the application may assign a priority to a connection. In the example shown, application A 406 may be a high priority application (e.g., text messaging) while application B 408 may be a low priority application (e.g., information sensor).

An UE may change from low priority access configuration from normal to low sets up a new PDN connection after the change of setting. In such a case, the UE 400 may then maintain two connections, one low priority and one normal priority. Accordingly, the UE 400 can behave as low priority access UE or as a normal priority access UE based on application requirements of applications included in the UE 400. Applications may similarly be configured to change access priority.

Thus, a given UE may have varied priority needs for network connections. During mobility scenarios, such as movement of the UE from a basic service area of a first AP (source network) to a second basic service area of a second AP (target network), the UE may transmit a TAU message to the target AP to facilitate migration of the session established with the source network to the target network. The TAU message may include an indicator to specify the access priority for the UE. In some implementations, the indicator may accommodate one value. However, as discussed above, a UE may have different priority access links established for different applications. Accordingly, a determination of which value to specify in the TAU message for access priority may be performed.

A TAU message may also be triggered after an idle period for the UE. Upon exiting the idle state, the UE may need to "refresh" its status with the network. One method for refreshing may include transmitting a TAU message. It will be appreciated that while reference is made to TAU messages as the medium for transmitting the access priority for mobility events, other messages may include the access priority such as other NAS signals, a paging response signal, a location update signal, a routing area update signal, or other similar signal transmitted to an AP.

Figure 5:
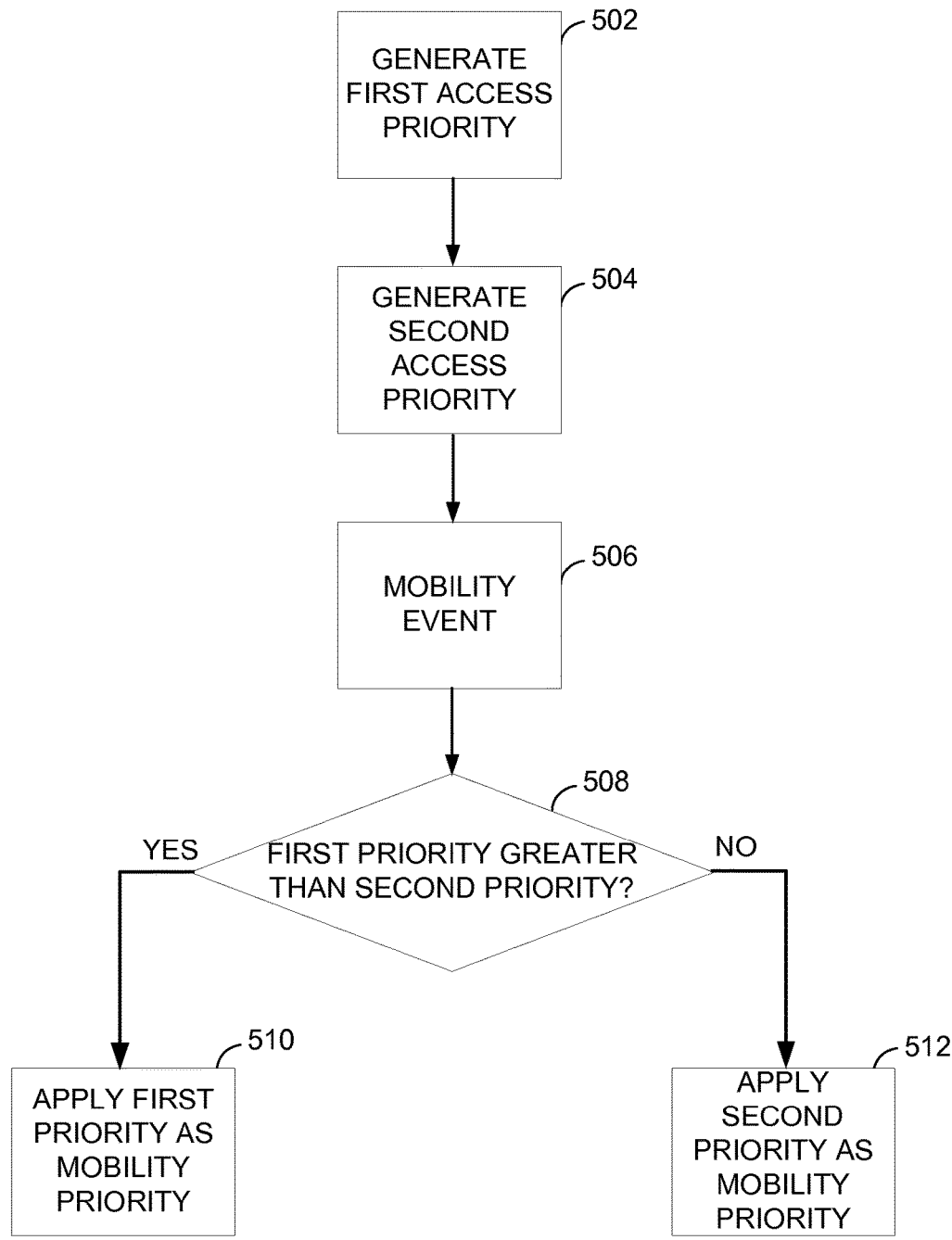
FIG. 5 illustrates a signal diagram for an exemplary method of establishing connections that may be employed within the communication network of FIG. 1.

FIG. 5 illustrates a process flow diagram for an exemplary method of determining mobility event signal priority that may be employed within the communication network of FIG. 1. The process shown in FIG. 5 may be implemented in one or more of the communication devices described above. In some implementations, a user equipment, or device associated with the user equipment, may implement the process.

At block 502, a first priority access is generated. The first priority access may be for a first application. At block 504, a second priority access is generated. The second priority access may be for a second application. At a block 506, a mobility event (e.g., change of location, return from idle) occurs. As discussed above, the mobility event may cause the communication device to transmit an update signal to identify its status with the network. At decision block 508, a determination is made based on the first and second priorities. If the first priority is greater than the second priority, the process continues to block 510 where the mobility signal access priority is set to the first priority. The first priority being "greater" than the second priority may refer to the first priority being for communications that are more time sensitive than the second priority. For example, the first priority may be a voice call. Any delay in transmitting a voice call will likely result in poor user experience of the call. The second priority may be for data pushed for a news feed. This application may not be as time sensitive as the voice call whereby the user experience may not be as frustrating if the news is not updated expediently. Accordingly, the determination selects the "highest" priority, that is, the priority associated with the most critical communication flow, as the identifying access priority to include in the mobility signal. Returning to decision block 512, if the second priority is higher than the first priority, then the process continues to block 516 where the second priority is used as the access priority for the mobility signal.

In some circumstances, the first and second priority may both be "normal" priority. In this case, the UE would not set the low priority access device property in the mobility signal. Conversely, the first and second priority may both be low priority. In this case, the UE would set the low priority access device property in the mobility signal.

Figure 6:
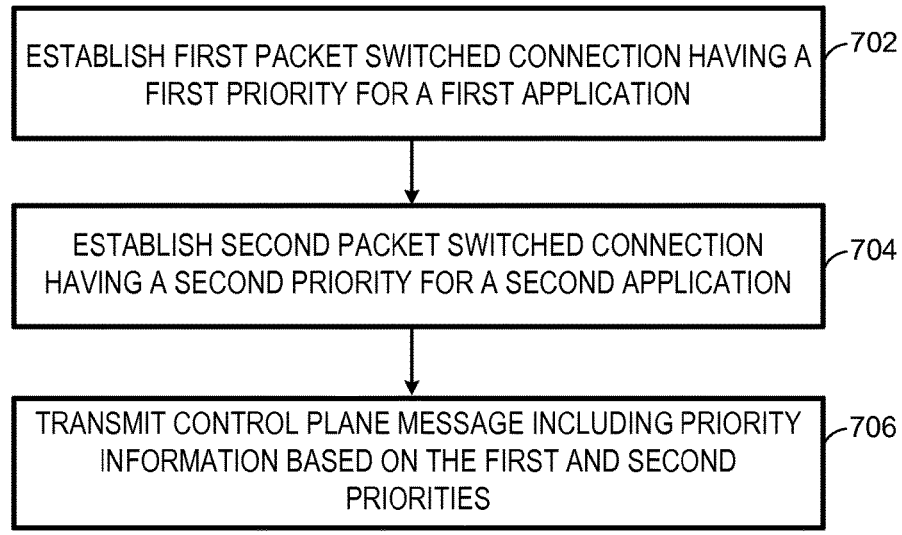
FIG. 6 illustrates process flow diagram of an exemplary method of communication that may be employed within the communication network of FIG. 1.

FIG. 6 illustrates process flow diagram of an exemplary method of communication that may be employed within the communication network of FIG. 1. The method of FIG. 6 may be implemented in an user equipment. At block 702, a first packet switched connection having a first priority is established for a first application. At block 704, a second packet switched connection having a second priority is established for a second application. At block 706, a control plane message including priority information is transmitted based at least in part on the first priority and second priority. The information may include a mobility signal as described above.

Figure 7:
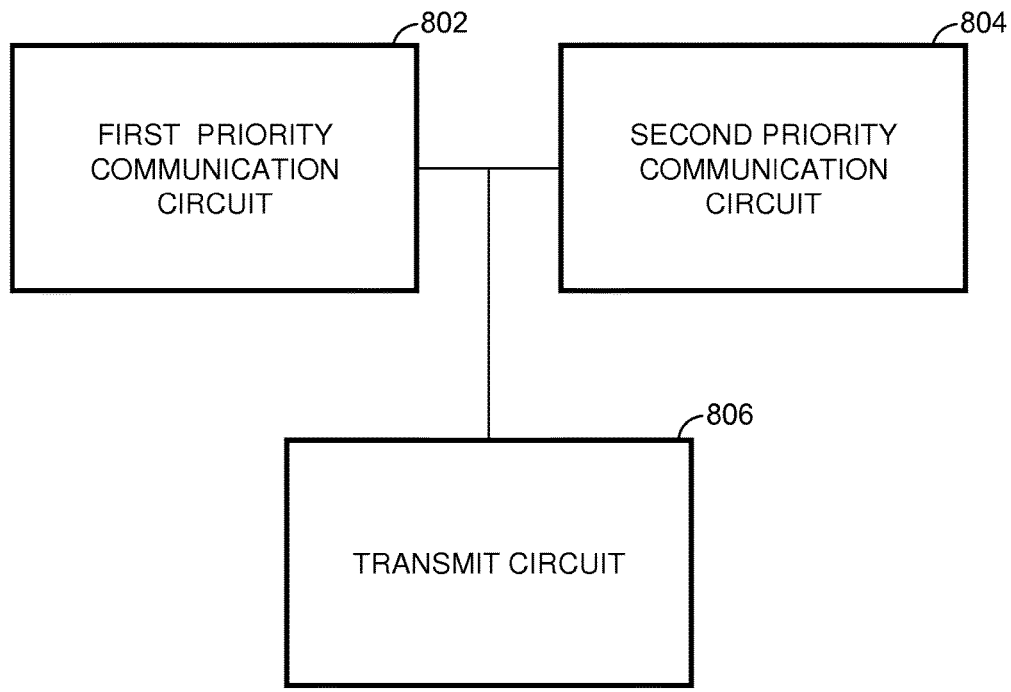
FIG. 7 illustrates a functional block diagram of an exemplary communication device that may be employed within the communication network of FIG. 1.

FIG. 7 illustrates a functional block diagram of an exemplary communication device that may be employed within the communication network of FIG. 1. The exemplary communication device 800 may be configured to implement one or more of the methods described above. Those skilled in the art will appreciate that a communication device may have more components than the simplified communication device 800 shown in FIG. 7. The communication device 800 shown includes only those components useful for describing some prominent features of certain implementations. The communication device 800 includes a first priority communication circuit 802, a second priority communication circuit 804, and a transmission circuit 806.

In some implementations, the first priority communication circuit 802 may be configured to establish a first packet switched connection having a first priority for a first application. The first priority communication circuit 802 may include one or more of a NAS signaling module, a processor, a transmitter, and a memory. In some implementations, means for establishing a first connection may include the first priority communication circuit 802.

In some implementations, the second priority communication circuit 804 may be configured to establish a second packet switched connection having a second priority to a second application. The second priority communication circuit 804 may include one or more of a NAS signaling module, a processor, a transmitter, and a memory. In some implementations, means for establishing a second connection may include the second priority communication circuit 804.

In some implementations, transmission circuit 806 may be configured to transmit a control plane message including priority information based on the first priority and the second priority. The transmission circuit 806 may include one or more of a transmitter, an antenna, and a processor. In some implementations, means for transmitting information may include the transmission circuit 806.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. An apparatus for communicating in a multiple access wireless communications network, the apparatus comprising a processor configured to:
   transmit, by a wireless device, a first control plane message comprising a first value for a priority indicator, the first value for the priority indicator setting a low priority access device property of the wireless device for the multiple access wireless communications network;

establish, by the wireless device, one or more packet switched connections associated with one or more applications of the wireless device;

determine, by the wireless device, that at least one of the one or more packet switched connections is associated with an application having a priority access level for the multiple access wireless communications network that is higher than the low priority access device property, wherein the priority access level of the application is one of a high priority or a normal priority; and transmit, by the wireless device based on the determining, a second control plane message comprising a second value for the priority indicator, the second value for the priority indicator clearing the low priority access device property of the wireless device for the multiple access wireless communications network.

2. The apparatus of claim 1, wherein the second control plane message comprises a mobility message, and wherein the mobility message comprises the priority indicator.

3. The apparatus of claim 2, wherein the mobility message comprises at least one of a tracking area update message, a location update message, and a routing area update message.

4. The apparatus of claim 2, wherein the mobility message comprises a non-access stratum message.

5. The apparatus of claim 1, wherein the second control plane message includes information to maintain at least one of the one or more packet switched connections.

6. The apparatus of claim 1, wherein the one or more packet switched connections comprise IP network connections.

7. The apparatus of claim 1, wherein the one or more packet switched connections comprise a packet data network connection.

8. The apparatus of claim 7, wherein the one or more packet switched connections are associated with one or more network addresses.

9. The apparatus of claim 8, wherein the one or more network addresses are different network addresses.

10. The apparatus of claim 8, wherein the one or more network addresses are a same network address.

11. The apparatus of claim 7, wherein the one or more packet switched connections are associated with a first network node and a second network node.

12. The apparatus of claim 11, wherein the first network node is different than the second network node.

13. The apparatus of claim 11, wherein the first network node is the same as second network node.

14. The apparatus of claim 1, further comprising a transceiver coupled with the processor, wherein the processor is configured to cause the transceiver to wirelessly establish the one or more packet switched connections, and wirelessly transmit the first control plane message and the second control plane message.

15. A method of communicating in a multiple access wireless communications network, the method comprising:

transmitting, by a wireless device, a first control plane message comprising a first value for a priority indicator, the first value for the priority indicator setting a low priority access device property of the wireless device for the multiple access wireless communications network;

establishing, by the wireless device, one or more packet switched connections associated with one or more applications of the wireless device;

determining, by the wireless device, that at least one of the one or more packet switched connections is associated with an application having a priority access level for the multiple access wireless communications network that is higher than the low priority access device property, wherein the priority access level of the application is one of a high priority or a normal priority; and transmitting, by the wireless device based on the determining, a second control plane message comprising a second value for the priority indicator, the second value for the priority indicator clearing the low priority access device property of the wireless device for the multiple access wireless communications network.

16. The method of claim 15, wherein the second control plane message comprises a mobility message, and wherein the mobility message comprises the priority indicator.

17. The method of claim 16, wherein the mobility message comprises at least one of a tracking area update message, a location update message, and a routing area message.

18. The method of claim 16, wherein the mobility message comprises a nonaccess stratum message.

19. The method of claim 15, wherein the second control plane message includes information to maintain at least one of the one or more packet switched connections.

20. The method of claim 15, wherein the one or more packet switched connections comprise IP network connections.

21. The method of claim 15, wherein the one or more packet switched connections comprise a packet data network connection.

22. The method of claim 21, wherein the one or more packet switched connections are associated with one or more network addresses.

23. The method of claim 22, wherein the one or more network addresses are different network addresses.

24. The method of claim 22, wherein the one or more network addresses are a same network address.

25. The method of claim 21, wherein the one or more packet switched connections are associated with a first network node and a second network node.

26. The method of claim 25, wherein the first network node is different than the second network node.

27. The method of claim 24, wherein the first network node is the same as second network node.

28. The method of claim 15, wherein at least one of establishing the one or more packet switched connections, and transmitting the first control plane message and the second control plane message comprises wireless communication.

29. A non-transitory computer readable medium comprising instructions for communicating by a wireless device in a multiple access wireless communications network, the instructions, when executed by a computer, causing the wireless device to:

transmit a first control plane message comprising a first value for a priority indicator, the first value for the priority indicator setting a low priority access device property of the wireless device for the multiple access wireless communications network;

establish one or more packet switched connections associated with one or more applications of the wireless device;

determine that at least one of the one or more packet switched connections is associated with an application having a priority access level for the multiple access wireless communications network that is higher than the low priority access device property, wherein the priority access level of the application is one of a high priority or a normal priority; and transmit, based on the determining, a second control plane message comprising a second value for the priority indicator, the second value for the priority indicator clearing the low priority access device property of the wireless device for the multiple access wireless communications network.

30. An apparatus for communicating in a multiple access wireless communications network, the apparatus comprising:

means for transmitting, by a wireless device, a first control plane message comprising a first value for a priority indicator, the first value for the priority indicator setting a low priority access device property of the wireless device for the multiple access wireless communications network;

means for establishing, by the wireless device, one or more packet switched connections associated with one or more applications of the wireless device;

means for determining, by the wireless device, that at least one of the one or more packet switched connections is associated with an application having a priority access level for the multiple access wireless communications network that is higher than the low priority access device property, wherein the priority access level of the application is one of a high priority or a normal priority; and means for transmitting, by the wireless device based on the determining, a second control plane message comprising a second value for the priority indicator, the second value for the priority indicator clearing the low priority access device property of the wireless device for the multiple access wireless communications network.

\* \* \* \* \*